June 17, 1924. 1,497,986
J. REID
BAND WHEEL POWER
Filed Sept. 20, 1923  2 Sheets-Sheet 2
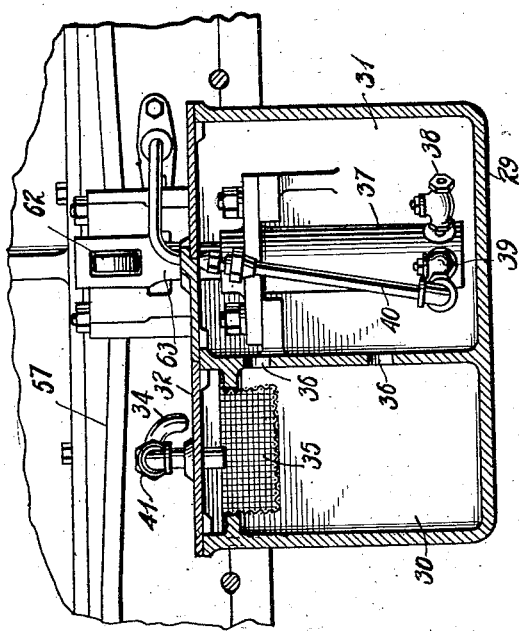
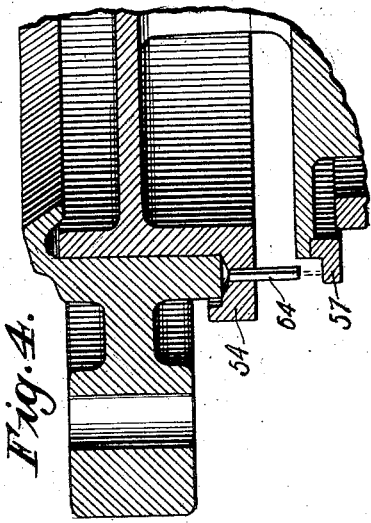
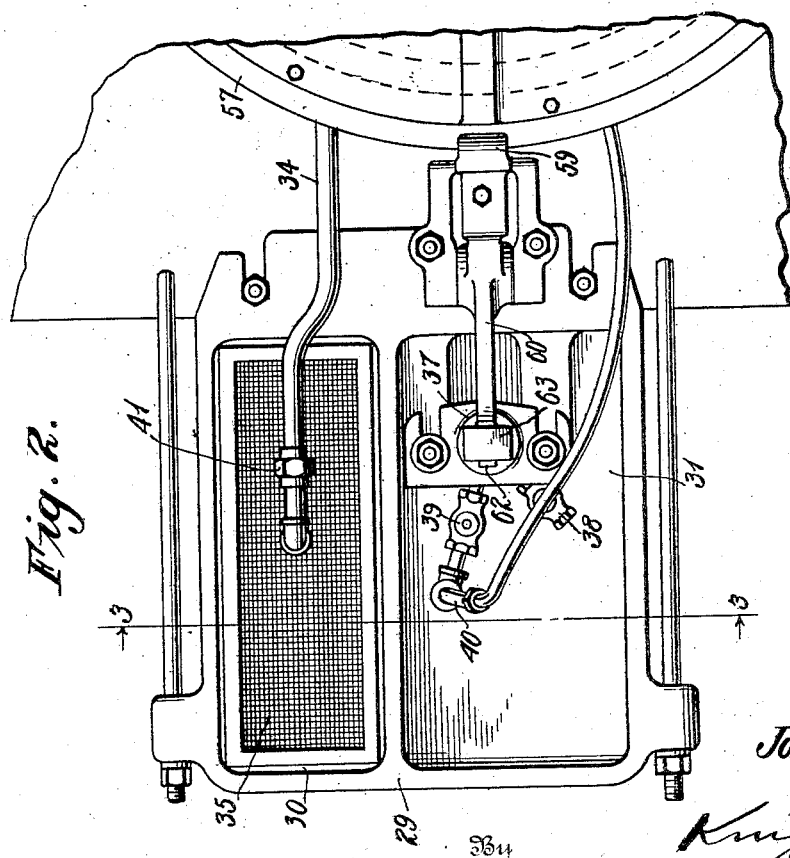
Inventor
John Reid
Knight Bro
Attorneys Patented June 17, 1924.

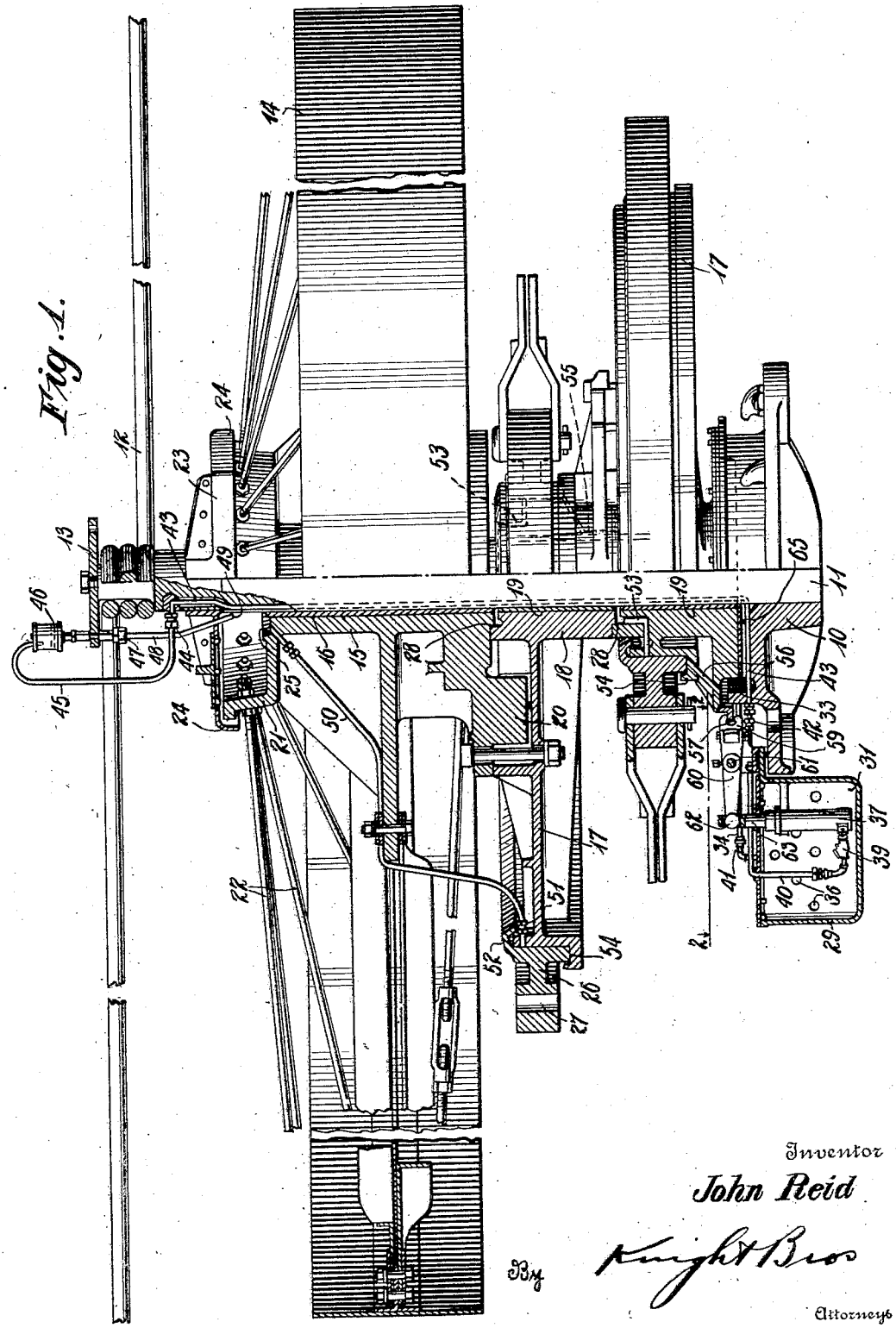

1,497,986

UNITED STATES PATENT OFFICE.

JOHN REID, OF OIL CITY, PENNSYLVANIA.

BAND-WHEEL POWER.

Application filed September 20, 1923. Serial No. 663,888.

*To all whom it may concern:*

Be it known that I, JOHN REID, a citizen of the United States, residing at Oil City, in the county of Venango and State of Pennsylvania, have invented certain new and useful Improvements in Band-Wheel Powers, of which the following is a specification.

This invention relates to band wheel powers, and particularly to a lubricating system for the same.

Devices of this character are employed for developing from a single source of power reciprocating movements in a plurality of connections extending in different radial directions outwardly to a corresponding number of pumps or other work. The device consists of a relatively large band wheel and the power is derived from the eccentrics adapted to be rotated with the power wheel, it being common practice to mount on these eccentrics, eccentric rings normally non-rotatable to which the power transmitting rods are connected. The band wheel and eccentrics are mounted to rotate on a vertically arranged shaft projecting upwardly from a fixed base.

Thus the particular object of my invention is to provide a lubricating system designed to positively, thoroughly and efficiently lubricate the several working parts of the power and to accomplish this without necessitating constant attention. As these band wheel powers are usually in continuous operation in the field it is essential that the lubrication be constant and my invention therefore contemplates means for automatically conveying the oil from a receptacle adjacent the base of the device to a point adjacent the top where it may be repeatedly employed for lubricating purposes throughout the machine.

My invention further contemplates the provision of means for preventing the entrance of dirt or other foreign matter into the working parts of the device thereby eliminating the possibility of the oil passages and the bearing surfaces becoming filled with dirt which would impede the passage of the oil and make impossible efficient lubrication.

My invention has therefore as its object to improve generally lubricating systems employed in connection with band wheel powers and consists furthermore in the novel combination, construction and arrangement of parts all of which will be made more apparent as this description proceeds, especially when considered with the accompanying drawings, wherein, Fig. 1 is an elevational view partly in section of a band wheel power equipped with my improved lubricating system, Fig. 2 is an enlarged fragmentary plan view taken substantially as indicated by lines 2—2 in Fig. 1, Fig. 3 is a fragmentary transverse sectional view taken on the plane indicated by line 3—3 in Fig. 2, and, Fig. 4 is an enlarged detail sectional view of the lubricating means for the pump actuating cam.

Referring now more particularly to the drawings wherein like reference characters indicate like parts, it will be noted that the band wheel power consists of a base 10 from which there projects in a vertical direction a shaft 11, it being common practice to mount the base 10 in a cement support and to support the upper end of the shaft 11 by brace rods 12 extending radially therefrom and secured at their ends at distant points to fixed supports. Secured to the upper end of the shaft 11 is a supporting plate 13 for a purpose to be later described.

The band wheel power 14 has a hub portion 15 provided with a bushing 16 which engages the shaft 11. Any number of eccentrics 17 may be provided, there being shown herein two, each eccentric being formed with a hub portion 18 having a bushing 19 which engages the shaft 11. The eccentrics 17 and the power wheel 14 are rotatable together, these parts being interlocked for synchronous rotary movement, preferably by means of locking projections 20 constructed preferably in accordance with my co-pending application Serial Number 651,411, filed July 13, 1923.

Formed preferably integrally with the hub 15 of the power wheel is a hub flange 21 by means of which connection is made with the ends of a plurality of tension spokes 22 connected at their outer ends to a band wheel 14. By forming the hub flange 21 in the manner illustrated a pan-like receptacle is provided, the open side of which is preferably closed by a sectional cover 23 clamped to the shaft 11 and provided with an overhanging edge 24 designed to prevent the entrance of dirt or other foreign matter into the interior of the hub flange. The hub 15 of the power wheel is formed with a circumferential channel or groove 25 hereinafter termed an oil channel, adapted to receive lubricant in a manner to be more fully hereinafter described.

Each of the eccentrics 17 has associated therewith an eccentric ring 26 preferably non-rotatably mounted, the periphery of which is provided with a plurality of apertures 27 to which the power transmitting rods are connected. The hub 18 of each eccentric 17 is provided with an oil channel or groove 28 adapted to receive and distribute lubricant in a manner to be more fully hereinafter described.

Arranged adjacent the base 10 of the device is an oil reservoir 29 divided into an oil receiving compartment 30 and an oil delivery compartment 31. In practice the reservoir 29 will be buried in the cement support in which the base 10 is secured with the cover 32 thereof flush with the upper surface of the support. The base 10 is formed with a lubricant channel or groove 33, with which there is connected a lubricant return pipe 34, the end of which passes through the cover 32 and is positioned over the lubricant receiving compartment 30. Mounted adjacent the top of this compartment is a strainer 35 through which the oil must pass before it is deposited in the compartment 30. The wall between the compartments 30 and 31 is preferably perforated as at 36 at a number of points to permit the oil to flow from the compartment 30 to the compartment 31.

Arranged in the compartment 31 is a pump 37 having an inlet opening 38 and an outlet opening 39 to which there is connected a lubricant delivery pipe 40. The lubricant return pipe 34 is provided with a coupling 41 while the lubricant delivery pipe 40 is provided with a coupling 42 whereupon these pipes may be disconnected when desired.

The lubricant delivery pipe 40 is connected by means of the coupling 42 with a pipe 43 which extends upwardly through the shaft 11 through a longitudinal groove arranged therein. The pipe 43 adjacent the upper end of the shaft 11 is connected by means of a coupling 44 with a pipe 45 which communicates with a sight feed gage 46 supported by the plate 13. By means of a coupling 47 a short oil delivery pipe 48 is connected to the gage 46, the end 49 of which delivers the lubricant against the surface of the shaft 11 as clearly illustrated in Fig. 1.

Connected to the lubricant channel 25 is a pipe 50 the delivery end 51 of which passes through the periphery of the upper eccentric 17 to deliver oil to the bearing surfaces of the eccentric and its associated ring 26. Each eccentric ring 26 is provided with an over-turned dirt excluding ledge 52 which overhangs the upper edge of each eccentric 17 in such a manner as to preclude the possibility of dirt or other foreign matter falling into the engaging surfaces of these parts.

The lubricant channel or groove 28 of each eccentric has extending therefrom an angularly arranged oil channel 53 formed in the hub of the eccentric and also extending through the periphery of the eccentric for conveying oil to the bearing surfaces of the eccentric and its associated ring.

Each eccentric 17 has formed on its lower edge a radial extending up-turned ledge 54, which not only supports the associated eccentric ring 26, but collects the lubricant which passes down between the bearing surfaces of the eccentric and its associated ring. Associated with the upper eccentric is an oil passage 55 which extends from the ledge 54 to the oil channel 28 to convey any oil collected in the channel 28 to the ledge as will be obvious. The ledge 54 associated with the lower eccentric is provided with a pipe 56 so disposed that the oil collected by this ledge will be delivered into the oil groove 23 formed in the base. The pipe 34 connected to the oil groove 33 is arranged at such a height with reference thereto that a certain amount of oil will be permitted to accumulate in the groove 33 before it reaches a height sufficient to flow through the pipe 34 to the receiving compartment 30.

Associated with the lower eccentric is a pump cam 57 arranged circumferentially thereof and adapted to engage a bronze shoe 59 removably secured to the end of a rocker arm 60, journalled as at 61 in a suitable support. The other end 62 of the rocker arm 60 is connected with the operating lever 63 of the pump 37 whereby the pump may be operated by the cam 57 as will be obvious. By an examination of Fig. 4 it will be seen that the cam 57 is lubricated by securing to the ledge 54 of the lower eccentric a short lubricant delivery pipe 64 arranged at the proper circumferential point to deliver the lubricant to this cam. Therefore some of the lubricant collected by the ledge 54 is conducted to the cam 57 while the remainder of this lubricant is returned by means of the pipe 56 to the oil groove 33.

In operation it will thus be seen that the pump will be actuated through the medium of the rocker arm 60 and the cam 57 to force oil through the pipes 40 and 43 upwardly to the sight feed gage 46 whereupon, it will be fed downwardly by gravity through the pipe 48 and discharged at the end 49 of this pipe onto the shaft 11. The oil will accumulate in the channel 25 and some of it will therefore flow through the pipe 50 to lubricate the bearing surfaces of the upper eccentric 17 and eccentric ring 26.

Other of the lubricant will flow downwardly between the bushing 16 of the power wheel and the shaft 11 and will therefore accumulate in the lubricant groove 28 of the upper eccentric. Some of the lubricant thus collected will flow through the passage 53 to lubricate the bearing surfaces of the upper eccentric and the eccentric ring. However, some of the lubricant will flow downwardly between the bushing 19 of the upper eccentric and the shaft 11 thus lubricating these parts and will be collected in the groove 28 of the lower eccentric. The lubricant collected in the ledge 54 of the upper eccentric will flow through the passage 55 and be deposited in the groove 28 formed in the hub of the lower eccentric. The passage 53 will convey oil from the lower groove 28 to the bearing surfaces of the lower eccentric and the eccentric ring to thoroughly lubricate these parts while some of the oil will flow downwardly between the bushing 19 of the lower eccentric and the shaft 11. Some of the oil collected by the ledge 54 of the lower eccentric will flow through the short delivery pipe 64 and lubricate the cam 57, while the remainder of this lubricant will be delivered to the oil groove 33 formed in the base 10. Any of the lubricant passing between the bushing 19 of the lower eccentric and the shaft 11 will flow into the slot 65 in which the pipe 43 is disposed and will then reach the oil groove 33.

When oil has accumulated in the groove 33 to the level of the pipe 34 it will flow therethrough into the compartment 30 of the reservoir 29 whereupon any foreign matter will be removed by the screen 35 and the oil accumulating in the compartment 30 may be again used.

From the foregoing it will be immediately apparent to those skilled in this art that I have provided a satisfactory lubricating system whereby all of the moving parts of a band wheel power may be thoroughly oiled. The action is positive inasmuch as the oil is pumped to the top of the device whereby it may pass by means of various channels to the parts to be lubricated and thence downwardly to the source of supply where it may be re-used. In this manner an economical lubricating system is provided, it being obviously unnecessary to replenish the supply of oil as frequently as when the unused oil is wasted. The lubrication of the band wheel power needs little or no attention as it is only necessary to replenish the supply of lubricant in the reservoir 29 at infrequent intervals it being furthermore rendered impossible for dirt or other foreign matter to enter the bearings and the working parts to thus impair their operation or obstruct the flow of lubricant.

While one constructional example of my improved system has been illustrated and described herein in some detail, it will be obvious to those skilled in this art that various modifications may be resorted to without departing from the spirit and scope of this invention and to this end I reserve the right to make such changes as may come within the purview of the accompanying claims.

Having thus described my invention, what I claim is:

1. The combination with a band wheel power having a shaft, a band wheel and a plurality of eccentrics rotatable with said band wheel about said shaft of a lubricating system including a pump, means connected to the pump for conveying the lubricant to the upper portion of said device and means for distributing said lubricant by gravity to the working parts of said device.

2. The combination with a band wheel power having a shaft, a band wheel and a plurality of eccentrics rotatable with said band wheel about said shaft of a lubricating system including a pump, means connected to the pump for conveying the lubricant to the upper portion of said device, means for distributing said lubricant by gravity to the working parts of said device and collecting the lubricant adjacent the pump.

3. The combination with a band wheel power having a shaft, a band wheel and a plurality of eccentrics mounted for rotation with said band wheel about said shaft of a lubricating system including a lubricant reservoir, a pump associated therewith, means connected to said pump for conveying the oil to a point adjacent the upper end of said band wheel power, said band wheel and eccentrics being formed with a plurality of oil conducting passages extending to the bearing surfaces of the movable parts whereby the oil may be conducted thereto by gravity and means for collecting the oil and conveying it to said reservoir.

4. The combination with a band wheel power having a shaft, a band wheel and a plurality of eccentrics mounted for rotation with said band wheel about said shaft of a lubricating system including a lubricant reservoir, a pump associated therewith, means connected to said pump for conveying the oil to a point adjacent the upper end of said band wheel power, said band wheel and eccentrics being formed with a plurality of oil conducting passages extending to the bearing surfaces of the movable parts whereby the oil may be conducted thereto by gravity, means for collecting the oil and conveying it to said reservoir, an oil collecting groove formed in the base of said band wheel power for collecting the used lubricant and means connecting said groove to said reservoir.

5. In a band wheel power of the class described, a shaft, a power wheel mounted for rotation thereon, a plurality of eccentrics connected to said band wheel for rotation therewith about said shaft, a lubricant reservoir, a pump associated therewith, means connected to said pump for conveying the oil to a point adjacent the upper end of said shaft where it is distributed by gravity to the working parts of the band wheel and eccentrics and a cam associated with one of said eccentrics for operating said pump.

6. In a band wheel power of the class described, a vertically arranged shaft, a band wheel mounted for rotation about said shaft, a plurality of eccentrics mounted on said shaft for rotation with said band wheel, a base supporting said shaft, a lubricant reservoir arranged adjacent said base, a pump associated therewith, means connected to said pump for conveying the lubricant to a point adjacent the upper end of said shaft, said band wheel and eccentrics being provided with hubs formed with lubricant receiving grooves, said lubricant flowing by gravity into said grooves along said shaft and means for conducting said oil from said grooves to the bearing surfaces of said eccentrics.

7. In a band wheel power of the class described, a vertically arranged shaft, a band wheel mounted for rotation about said shaft, a plurality of eccentrics mounted on said shaft for rotation with said band wheel, a base supporting said shaft, a lubricant reservoir arranged adjacent said base, a pump associated therewith, means connected to said pump for conveying the lubricant to a point adjacent the upper end of said shaft, said band wheel and eccentrics being provided with hubs formed with lubricant receiving grooves, said lubricant flowing by gravity into said grooves along said shaft, means for conducting said oil from said grooves to the bearing surfaces of said eccentrics, said base being formed with an oil collecting groove adapted to collect the used lubricant and means connected to said groove for conducting the oil back to said reservoir.

8. In an arrangement of the class described, a band wheel power comprising a vertically arranged shaft, a horizontal band wheel mounted on said shaft, a plurality of eccentrics mounted for rotation with said band wheel about said shaft, a lubricant reservoir, a pump associated with said reservoir and provided with means for conducting the oil to a point adjacent the upper end of said shaft, said band wheel being provided with a hub and hub rim, said hub being formed with a lubricant receiving groove, a sectional cover provided with an over-hanging edge associated with said hub rim for enclosing said lubricant receiving groove, said band wheel and eccentrics being formed with oil conduits whereby oil is fed by gravity to the working parts thereof.

9. In an arrangement of the class described, a band wheel power comprising a vertically arranged shaft, a horizontal band wheel mounted on said shaft, a plurality of eccentrics mounted for rotation with said band wheel about said shaft, a lubricant reservoir, a pump associated with said reservoir and provided with means for conducting the oil to a point adjacent the upper end of said shaft, said band wheel being provided with a hub and hub rim, said hub being formed with a lubricant receiving groove, a sectional cover provided with an over-hanging edge associated with said hub rim for enclosing said lubricant receiving groove, said band wheel and eccentrics being formed with oil conduits whereby oil is fed by gravity to the working parts thereof, eccentric rings associated with said eccentrics and dirt excluding ledges formed on said rings and over-hanging the bearing surfaces between said rings and said eccentrics.

10. In a band wheel power a base, a shaft extending vertically therefrom, a band wheel rotatably mounted on said shaft, a plurality of eccentrics mounted on said shaft for rotation with said band wheel, said band wheel and eccentrics being provided with hubs formed with lubricant receiving grooves, stationary eccentric rings associated with each eccentric, a lubricant reservoir arranged adjacent said base, a pump associated therewith, means connected to said pump for conveying the lubricant to a point adjacent the upper end of said shaft, said oil flowing by gravity down said shaft to said lubricant receiving grooves, means associated with said lubricant receiving grooves for conducting the lubricant accumulated therein to the bearing surfaces of said eccentrics and eccentric rings.

11. In a band wheel power a base, a shaft extending vertically therefrom, a band wheel rotatably mounted on said shaft, a plurality of eccentrics mounted on said shaft for rotation with said band wheel, said band wheel and eccentrics being provided with hubs formed with lubricant receiving grooves, stationary eccentric rings associated with each eccentric, a lubricant reservoir arranged adjacent said base, a pump associated therewith, a cam carried by one of said eccentrics for operating said pump, means connected to said pump for conveying the lubricant to a point adjacent the upper end of said shaft, said oil flowing by gravity down said shaft to said lubricant receiving grooves and means associated with said lubricant receiving grooves for conducting the lubricant accumulated therein to the bearing surfaces of said eccentrics and eccentric rings, 12. In a band wheel power a base, a shaft extending vertically therefrom, a band wheel rotatably mounted on said shaft, a plurality of eccentrics mounted on said shaft for rotation with said band wheel, said band wheel and eccentrics being provided with hubs formed with lubricant receiving grooves, stationary eccentric rings associated with each eccentric, a lubricant reservoir arranged adjacent said base, a pump associated therewith, a cam carried by one of said eccentrics for operating said pump, means connected to said pump for conveying the lubricant to a point adjacent the upper end of said shaft, said oil flowing by gravity down said shaft to said lubricant receiving grooves, means associated with said lubricant receiving grooves for conducting the lubricant accumulated therein to the bearing surfaces of said eccentrics and eccentric rings, and means associated with one of said eccentrics for conveying lubricant to said cam.

13. The combination with a power having a shaft, a power wheel, eccentrics rotatable with said power wheel about said shaft, and eccentric rings associated with said eccentrics, of a lubricating system including a source of lubricant, means for conveying the lubricant to the upper portion of the device whereby it may be distributed by gravity to the working parts, and dust excluding portions formed on said eccentric rings and overhanging the bearing surfaces between said rings and eccentrics.

The foregoing specification signed at Oil City, Pa., this 21st day of July, 1923.

JOHN REID.